United States Patent [19]

Kim

[11] Patent Number: 5,209,075
[45] Date of Patent: May 11, 1993

[54] CURRENT CONTROLLING APPARATUS AND METHOD FOR AIR CONDITIONING APPARATUS

[75] Inventor: Tae D. Kim, Taekoo, Rep. of Korea

[73] Assignee: SamSung Electronics Co., Ltd., Suwon, Rep. of Korea

[21] Appl. No.: 792,929

[22] Filed: Nov. 15, 1991

[30] Foreign Application Priority Data

Nov. 20, 1990 [KR] Rep. of Korea ............ 90-18830

[51] Int. Cl.⁵ .................................. F25B 1/00
[52] U.S. Cl. .......................... 62/126; 62/129; 62/230; 361/22
[58] Field of Search ............ 62/160, 230, 126, 127, 62/129; 361/22, 24, 31

[56] References Cited

U.S. PATENT DOCUMENTS

| | | | |
|---|---|---|---|
| 4,517,812 | 5/1985 | Umezu | 62/230 X |
| 4,709,292 | 11/1987 | Kuriyama et al. | 361/22 |
| 4,736,595 | 4/1988 | Kato | 62/160 |
| 4,968,338 | 11/1990 | Sugiyama | 62/126 |

Primary Examiner—Harry B. Tanner
Attorney, Agent, or Firm—Robert E. Bushnell

[57] ABSTRACT

A current control method and apparatus for use in an air conditioning apparatus is disclosed. A total current detection portion is mounted at the AC power supply portion and a peak current detection device is mounted between the conversion portion and the inverter. The total current detection portion detects a maximum current applied to the air conditioning apparatus and the peak current detection portion detects a peak current generated in the inverter. The limitation of the detected total current value is particularly preset in the heating and in the cooling operations. When the detected value surpasses the preset limitation, the inverter motor is stopped.

4 Claims, 4 Drawing Sheets

CURRENT CONTROLLING APPARATUS AND METHOD FOR AIR CONDITIONING APPARATUS

BACKGROUND OF THE INVENTION

Field of the Invention

This invention relates to a current control apparatus and method for air conditioning apparatus and, more particularly, to a current control apparatus and method which sets limitation of the total current in the cooling operation and heating operation and protects an inverter from excess current by detecting current in the inverter.

Generally, the capacity of an outdoor air conditioning apparatus is determined by the capacity of the compressor. Operating capacity of a compressor is dependent on the speed of rotation of the compressor motor which is dependent on its supply frequency. The supply frequency is controlled by the switching operation of the inverter.

When an inverter is used for controlling a compressor, an air conditioning apparatus accurately detects the total current flowing in the inverter and, if the detected current value is excessive to a predetermined current limitation, the compressor stops so that the current flowing in the inverter is not greater than the predetermined limit value.

The switching elements of an inverter comprise semiconductor elements such as a power transistor. However, the physical characteristics of a semiconductor are sensitive to temperature change. Especially, where there is a wide difference between the outside temperatures during the cooling operation in summer and the heating operation in winter, an air conditioning apparatus with an inverter comprising semiconductor elements has a disadvantage in that, because the quantity of current applied to the compressor varies greatly, the air conditioning apparatus is set on parameter adapted to one of the two seasons malfunctions in other season.

That is to say, if the parameter of the semiconductor is set to operate in the cooling mode, in the heating operation, the quantity of current applied to compressor by the inverter is less so that the rotation speed of the compressor is lower than that required in the heating operation. Therefore, the air conditioning apparatus malfunctions. If the semiconductor is set to operate in the heating mode, to the contrary of the above described case, excessive current flows in the inverter, resulting in the semiconductor element being damaged.

A typical example of the above described air conditioning apparatus is disclosed in Japanese laid open publication No. 58-17997. This apparatus detects excessive current. It not only periodically stops the operation of the compressor but also fixes the rotation frequency of the motor every time an excessive current flows in the inverter. Thus, when the rotation of the inverter motor is reversed by an external power, even if it operates, the direction of its rotation is corrected to the normal rotation direction without halting the operation of the inverter. Thus, the inverter is protected from excessive current.

However, the present invention differs from the above described apparatus in that the semiconductor elements are prevented from breakdown resulting from a large difference in current flowing in the inverter during the heating mode and the cooling mode.

Also, there is an another problem. When a peak current is generated in the inverter, it causes a breakdown of the semiconductor element thereby disturbing normal operation. Accordingly, a conventional apparatus detects peak current by a current transformer or shunt resistor and prevents a malfunction caused by the peak current. However, a system using a current transformer does not detect a minute quantity of current because of the characteristics of transformer. Because current shunted by an resistor is detected by the shunt resistor, a system using a shunt resistor is the same. Therefore, these systems have a problem in that they do not guard against the problem caused by peak current.

SUMMARY OF THE INVENTION

It is an object of the present invention to supply a current controlling apparatus and method which protects the inverter from excessive current caused by the total current and peak current applied to air conditioning apparatus.

Another object of the present invention is to supply a current control apparatus and method which sets the limitation level of the current to a two step level according to the operating mode or to a multistage level according to the operating command frequency thereby preventing abnormal operation of the inverter generated by excessive current.

In order to achieve the above objects, a total current detection portion is mounted at the AC power supply portion and a peak current detection device is mounted between the rectifying portion and the inverter. The total current detection portion detects a maximum current applied to the air conditioning apparatus and the peak current detection portion detects a peak current generated in the inverter. The limitation of the detected total current value is particularly preset in the heating and cooling operations. When the detected values surpass the preset limitation, the inverter motor is stopped.

DETAILED DESCRIPTION OF THE INVENTION

The invention will be described in more detail hereinafter with reference to the accompanying drawings.

Figure 1:
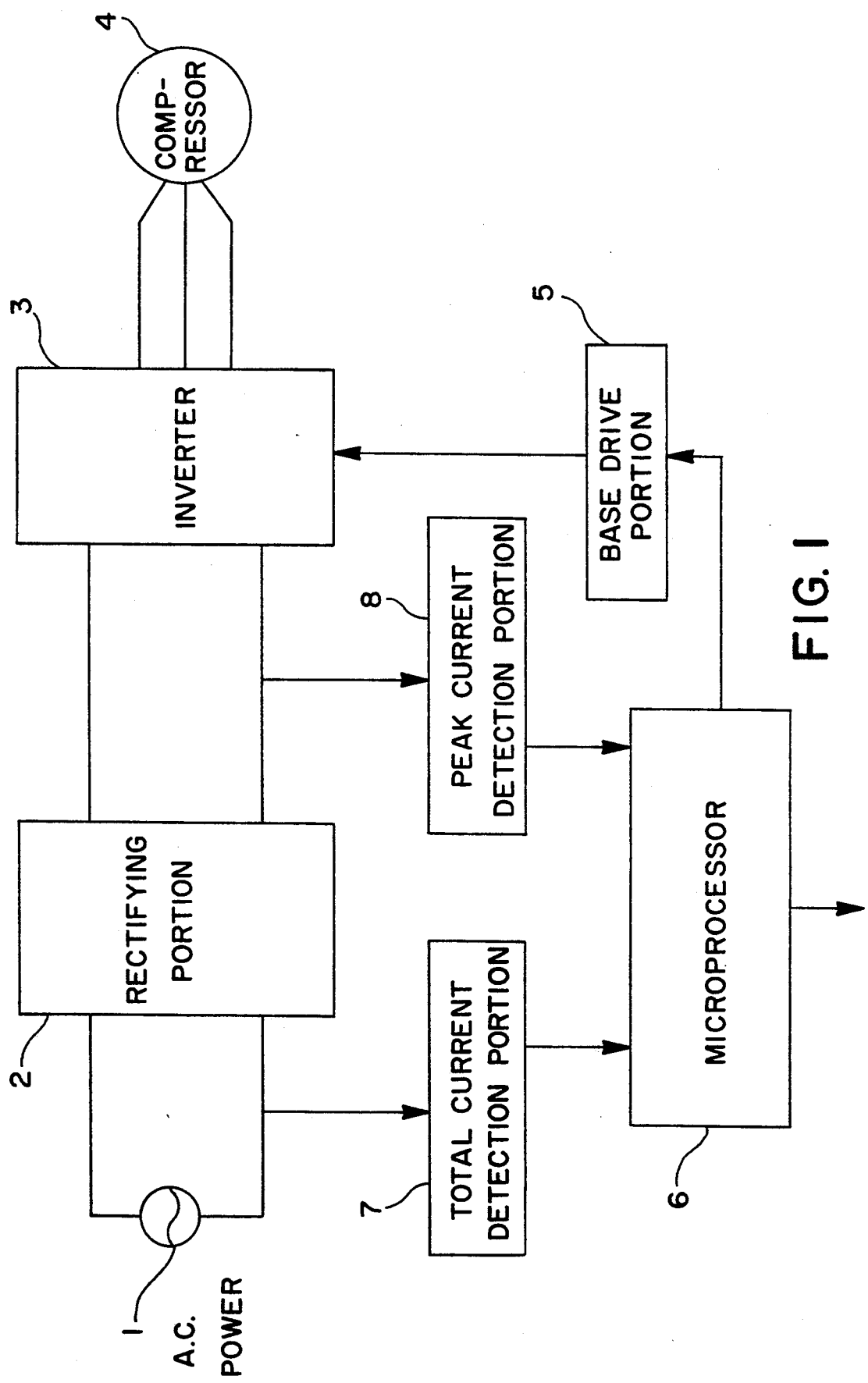
FIG. 1 is a block diagram showing the current control apparatus according to the present invention.
Figure 2:
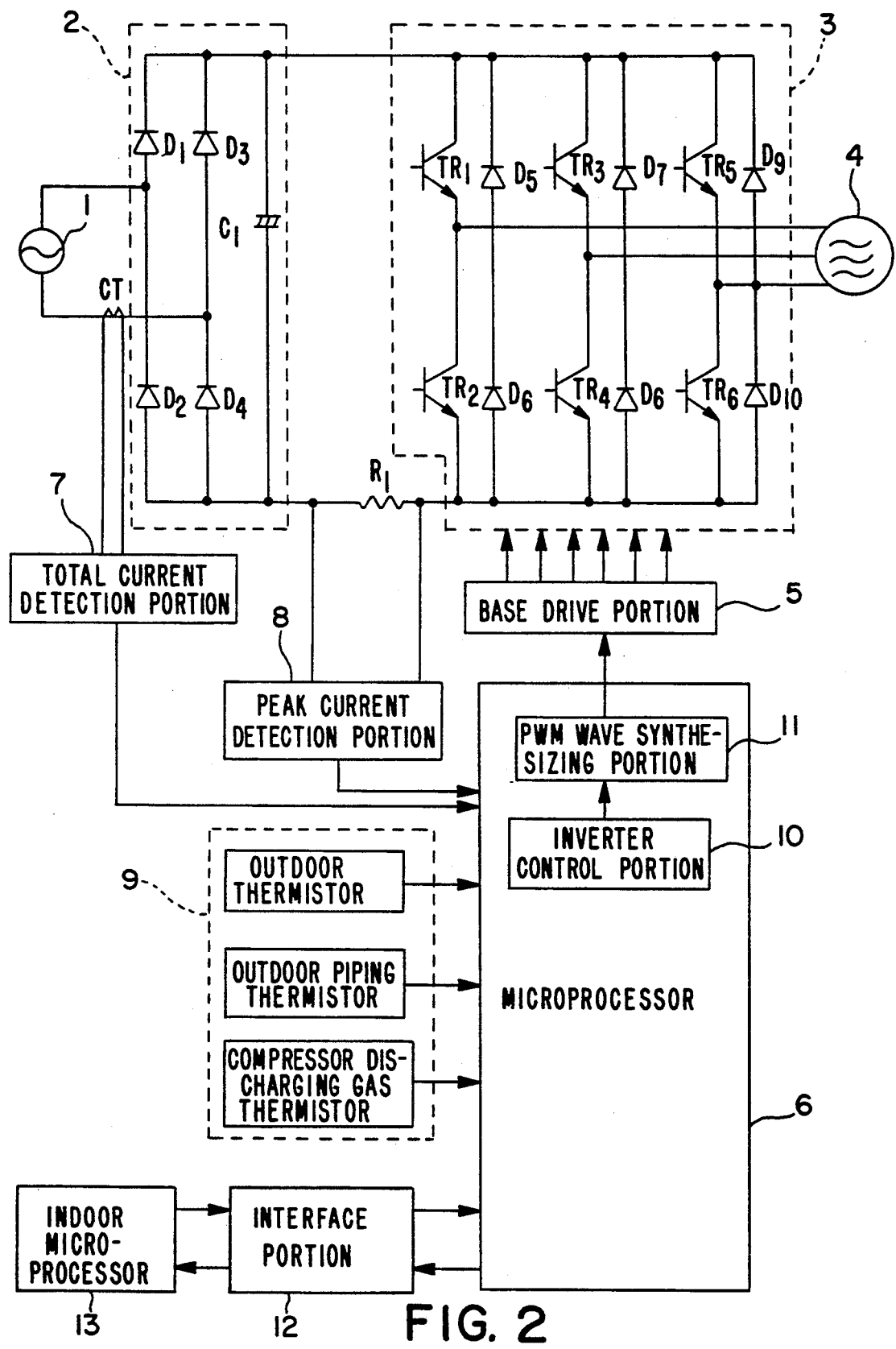
FIG. 2 is a schematic diagram showing the current control apparatus according to the present invention.

FIG. 1 shows the control portion of an air conditioning apparatus according to the present invention. FIG. 2 is a detailed drawing of FIG. 1. The rectifying portion 2 is connected to a commercial power source and rectifies A.C. power supplies rectified A.C. power as D.C. power. The inverter portion 3 converts the pulsating D.C. output of the rectifying portion into three phase A.C. which is supplied to the motor of the compressor 4. The base drive portion 5 supplies a control signal to the bases of transistors TR1-TR6 of the inverter portion 3. The microprocessor 6 outputs a control signal to the base drive portion 5 which is obtained by processing outdoor temperature data and current data received from the below described detection portions. The total current detection portion 7 detects current by a current transformer mounted between the commercial power source and the rectifying portion 2 and outputs the detected total current value to the microprocessor 6. The peak current detection portion 8 detects peak current flowing in a shunt resistor mounted between the rectifying portion 2 and the inverter portion 3 and outputs the detected peak current value to the microprocessor 6. The temperature sensing portion 9 senses indoor and outdoor temperature, indoor and outdoor piping temperature and compressor discharging gas temperature and so on and outputs the sensed data to the microprocessor 6. The interface portion 12 connects the microprocessor 6 of outdoor device and microprocessor of indoor device.

Here, the microprocessor 6 includes an inverter control portion 10 for determining compressor operation frequency depending on external data and outputs a control data and PWM (Pulse Width Modulation) wave synthesizing portion 11 for varying the pulse width of the signal driving the base drive portion 5 according to the operation command frequency of the inverter control portion 10.

The operation of the apparatus according to the present invention is described as follows:

A.C. power applied to the apparatus from a commercial power source is rectified in the rectifying portion 2. The rectified power is applied to the inverter portion 3. At this time, the inverter control portion 10 outputs a control signal to the PWM wave synthesizing portion 11, so the PWM wave synthesizing portion 11 forms a PWM wave. The PWM wave is applied to the base drive portion 5. The transistors TR1-TR6 of the inverter portion 3 are particularly turned on and off by the PWM wave, so the three outputs of the inverter portion 3 output the three phase A.C. power supply. An induction motor for compressor 4 is driven by the three phase A.C. power supply. The D.C. output of the rectifying portion 2 is applied to the inverter portion 3 and returns to the rectifying portion 2 through the shunt resistor R1 forming a current loop. At this time, current flowing in the shunt resistor R1 is detected by the peak current detection portion 8. The detected peak current value is output to the microprocessor 6.

When the detected value is above the predetermined value, the microprocessor 6 transmits a halt signal to the base drive portion 5, turning off transistors TR1-TR6 of the inverter portion 5 thereby halting the operation of the induction motor of the compressor 4. Also, when the detected value is below the predetermined value, it is inquired as to whether the total current value detected by the total current detection portion 7 is below the predetermined value. When the total current value is below the predetermined value, the induction motor of the compressor 4 is powered. When the total current value is above the predetermined value, the operation of the motor is halted after a predetermined time. The predetermined values are separately set by the external environment data detected by the temperature sensing portion 9 in heating mode and cooling mode.

Figure 3:
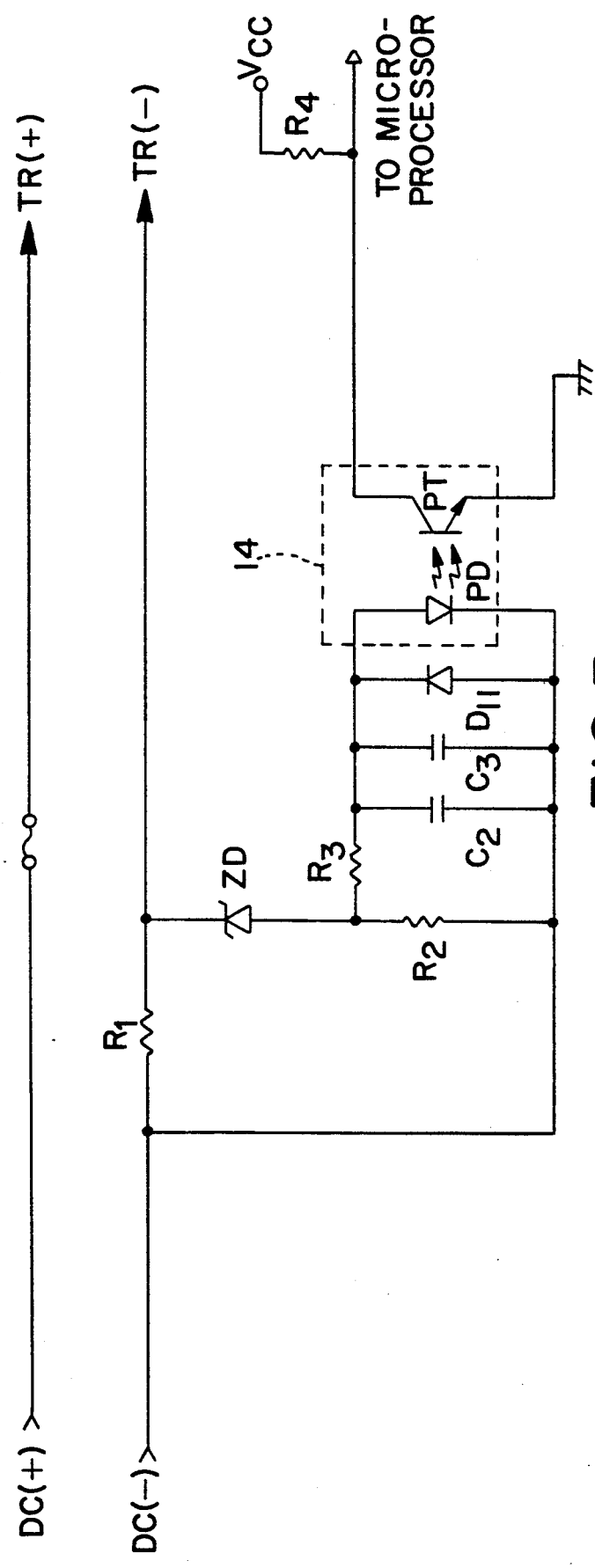
FIG. 3 is a schematic diagram showing the peak current detection portion according to the present invention.

FIG. 3 is a schematic diagram showing the peak current detection portion 8 according to the present invention. As shown in FIG. 3, the peak current detection portion 8 comprises a zener diode ZD and a resistor R2 connected to the shunt resistor R1 with a resistor R3 connected to the common terminal of zener diode and resistor R2 and capacitors C2 and C3, diode D11, photo-coupler 14 and, resistor R4 connected to the output end of photo-coupler and power terminal Vcc.

The operation of the peak current detection portion 8 is described as follows:

When current flows in the shunt resistor R1, a voltage difference exists between the two ends of the shunt resistor R1. When the voltage is below the zener voltage of the zener diode ZD, the zener diode ZD is turned off, so the light emitting element of the photo-coupler 14 is not activated. The high level signal is applied to the microprocessor 6, so the microprocessor 6 recognizes that current flowing in the apparatus is normal. If excessive current flows in the shunt resistor R1, the voltage applied to the shunt resistor R1 is above the zener voltage of the zener diode ZD, so the zener diode ZD is conducted. Because of the conduction of the zener diode ZD, current flows in the light emitting element PD of photo-coupler 14 through the resistor R3, so the light emitting element lights. Because the light receiving element PT is turned on by the light, the low level signal is applied to the microprocessor 6, so the microprocessor 6 senses an abnormal state due to excessive current.

Figure 4:
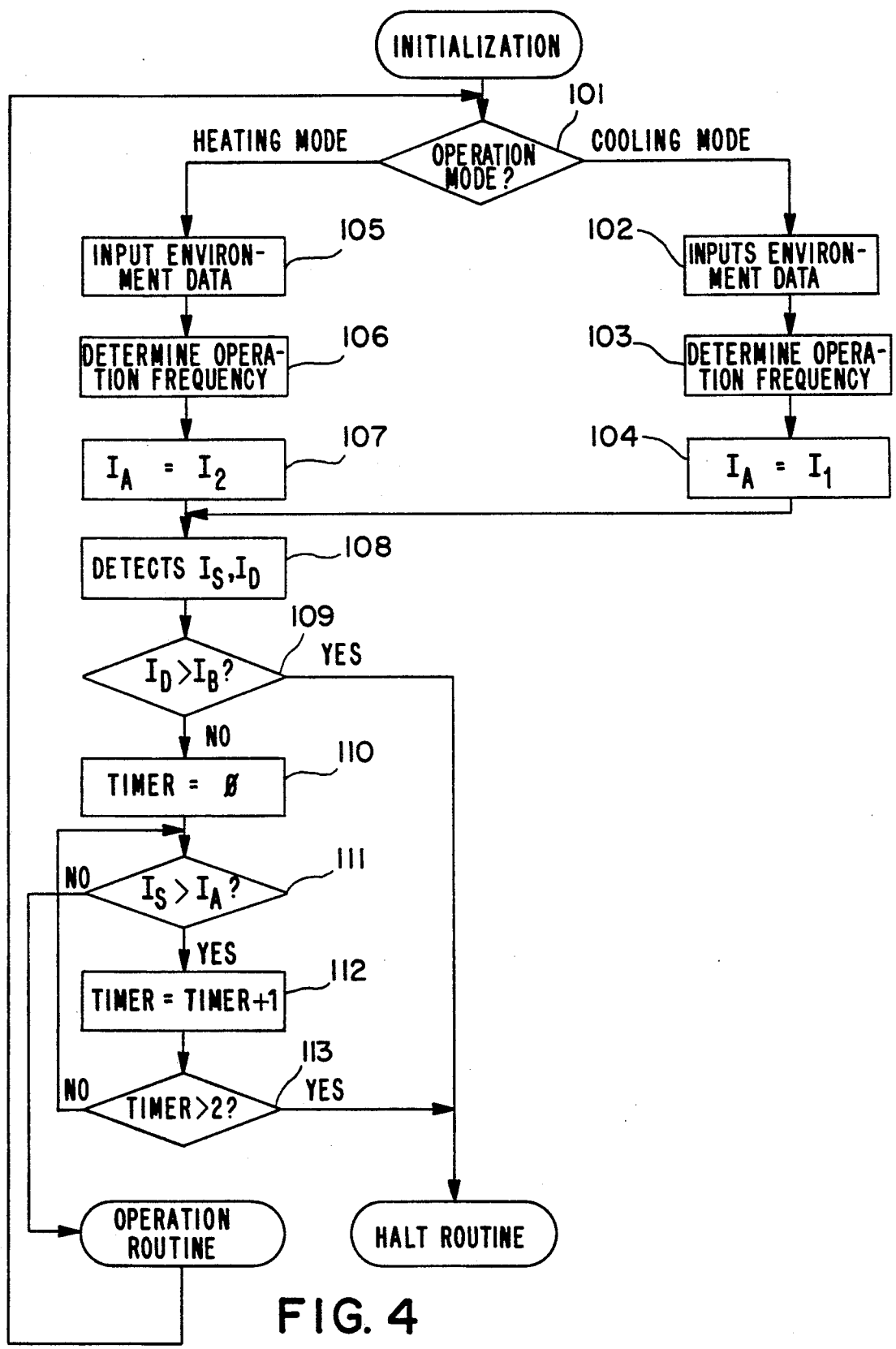
FIG. 4 is a flow chart showing the current control method according to the present invention.

FIG. 4 is a flow chart showing the current controlling method according to the present invention.

After supplying power and initializing, in step 101, it is inquired as to whether the user's selecting mode is in the heating mode or the cooling mode. In the cooling operation, in step 102, environment data is inputed from the indoor microprocessor and the temperature sensing portion 9. The input data corresponding to the air conditioning load includes indoor temperature and indoor piping temperature transmitted from the indoor device, and outdoor temperature, and outdoor piping temperature and compressor discharging gas temperature detected in the outdoor device and so on. In step 103, the environment data is inputed from the detecting portions, and the suitable operation frequency is read in the ROM table according to the environment data and the operation frequency of the inverter portion 3 is determined. In step 104, the total current limitation $I_A$ is set to the limitation current value $I_1$ suitable to cooling operation.

In the heating operation, in step 105, environment data corresponding to the air conditioning load are inputed. In step 106, the operation frequency of the inverter portion 3 is determined according to the inputed data. In step 107, the total current limitation $I_A$ is set to the limitation current value $I_2$ adapted to the heating operation. At this time, in reference to the temperature characteristics of the semiconductor, the total current limitation values are set so that they have the relation of $I1 < I2$.

In above description, the total current limitation value is particularly set to the two levels, that is the heating and cooling operations. However, the total current limitation value and the peak current value are divided into a multitude of level every frequency band thereby setting the total current limitation value and the peak current value to those adapted to the corresponding frequency band.

In step 108, the detected peak current ID is inputed from the peak current detection portion 8. In step 109, when the detected peak current ID is above the peak current limitation value IB, the operation halt routine is executed stopping the motor of the compressor 4. When the detected peak current ID is not above the peak current limitation value IB, the timer buffer is cleared to "0" (step 110). In step 111, the detected total current IS is compared with the total current limitation value IA.

When the detected total current IS is not above the total current limitation value IA, the normal operation routine is executed. When the detected total current IS is above the total current limitation value IA, timer buffer is increased by 1 (step 112).

In step 113, it is inquired whether the value of timer buffer is above the predetermined value (for example, 2). When the value of timer buffer is below the predetermined value, it is regarded as an instant current increment, so step 110 is repeated. If the detected total current IS is not above the total current limitation value IA, the normal operation routine is executed and this program returns to the step inquiring whether the operation mode is heating mode or cooling mode after executing operation routine. When the value of timer buffer is above the predetermined value, the halt routine is executed stopping the operation of the motor of the compressor 4.

As above described, the present invention accurately detects a total current applied to the air conditioning apparatus and a peak current applied to the inverter, so the inverter is protected from excessive current. The total current limitation value is particularly set in heating and cooling operations. Both the total current limitation value and the peak current limitation value are particularly set to the multistage value according to the operation frequency band. Thus, the compressor is controlled in a multitude of limitation values to not only protect the inverter elements but also to control the operation of the air conditioning apparatus.

What is claimed is:

1. A current control apparatus for use in an air conditioning apparatus separated into an indoor device and an outdoor device and providing a heating operation and a cooling operation, said current control apparatus comprising:

rectifying means for rectifying alternating current power to pulsating direct current power;

inverter means for converting the pulsating direct current power output of the rectifying portion into three phase alternating current power, said inverter means comprising plural transistors;

base drive means for supplying a control signal to bases of the transistors;

total current detection means for detecting current by a current transformer mounted between a source of the alternating power and the rectifying means and outputting the detected total current value;

peak current detection means for detecting peak current flowing in a shunt resistor mounted between the rectifying means and the inverter means and outputting the detected peak current value;

temperature sensing means for sensing at least indoor and outdoor temperature, indoor and outdoor piping temperature and compressor discharging gas temperature and outputting the above sensed data;

microprocessor means for outputting a control signal to the base drive means which is obtained by processing the temperature data received from the temperature sensing means and the current data received from the total current detection means and the peak current detection means, said microprocessor means comprising an indoor microprocessor and an outdoor microprocessor; and interface means for connecting the outdoor microprocessor and the indoor microprocessor.

2. The current controlling apparatus as claimed in claim 1, wherein said peak detection means comprises:

a differential means comprising a zener diode for providing a zener voltage as a reference voltage, said differential means determining whether voltage applied to said shunt resistor is greater than said reference voltage;

a voltage source for providing a normal operation indication signal to said microprocessor means; and a photo-coupler being turned on for grounding said voltage source when said differential means determines that said voltage applied to said shunt resistor is greater than said reference voltage.

3. A method of current control for use in an air conditioning apparatus, the method comprising the steps of:

determining whether the operation mode of the apparatus is a heating mode or a cooling mode and setting a total current limitation value or a peak current limitation value according to the determined mode after supplying power and initializing;

detecting the total current and the peak current applied to the air conditioning apparatus;

determining whether the detected peak current is above the peak current limitation value;

halting a motor of the air conditioning apparatus if the detected peak current is above the peak current limitation value;

halting the motor of the air conditioning apparatus when the detected total current is above the total current limitation value for a predetermined time period if the detected peak current is determined not to be above the peak current limitation value; and continuously driving the motor of the air conditioning apparatus when the detected total current is below the total current limitation value.

4. A method of current control for use in an air conditioning apparatus, the method comprising the steps of:

determining whether the operation mode is a heating mode or a cooling mode after supplying power and initializing;

determining, if in the heating mode, the operation frequency depending on the detected environment temperature from a temperature sensing means and setting a current limitation value to a value adapted to the heating operation; or determining, if in the cooling mode, the operation frequency depending on the detected environment temperature from the temperature sensing means and setting a current limitation value to a value adapted to the cooling operation; then detecting the total current and the peak current after setting the current limitation value;

inquiring whether the detected peak current is above the current limitation value;

halting the inverter motor when the detected peak current is above the current limitation value;

setting a timer buffer to "0" when the detected peak current is not above the current limitation value;

determining whether the detected total current is above the current limitation value;

executing an operation routine when the detected total current is not above the current limitation value;

increasing the timer buffer by "1" when the detected total current is above the total current limitation value;

inquiring whether the timer buffer is above a predetermined value;

executing the halt routine when the timer buffer is above the predetermined value;

returning to said step of determining whether the detected total current is above the current limitation value when the timer buffer is not above the predetermined value; and returning to the step inquiring as to whether the operation mode is in the heating mode or the cooling mode after executing the operation routine.

* * * * *

UNITED STATES PATENT AND TRADEMARK OFFICE
CERTIFICATE OF CORRECTION

PATENT NO. : 5,209,075
DATED : May 11, 1993
INVENTOR(S) : Tae Duk Kim

It is certified that error appears in the above-indentified patent and that said Letters Patent is hereby corrected as shown below:

On the title page, item [75], "Tae D. Kim" should read --Tae Duk Kim--.

Signed and Sealed this

Fifteenth Day of November, 1994

Attest:

BRUCE LEHMAN

Attesting Officer     Commissioner of Patents and Trademarks